United States Patent
Lii et al.

(10) Patent No.: US 8,963,846 B2
(45) Date of Patent: Feb. 24, 2015

(54) METHOD FOR CURSOR MOTION CONTROL BY A TOUCHPAD TO MOVE A CURSOR ON A DISPLAY SCREEN

(75) Inventors: Jia-Yih Lii, Taichung (TW); Wei-Kuo Chang, Hsinchu (TW)

(73) Assignee: Elan Microelectronics Corporation, Hsinchu (TW)

( * ) Notice: Subject to any disclaimer, the term of this patent is extended or adjusted under 35 U.S.C. 154(b) by 627 days.

(21) Appl. No.: 12/907,391

(22) Filed: Oct. 19, 2010

(65) Prior Publication Data

US 2011/0109575 A1    May 12, 2011

(30) Foreign Application Priority Data

Nov. 6, 2009   (TW) ................................ 98137827 A

(51) Int. Cl.
  *G06F 3/041* (2006.01)
  *G06F 3/0485* (2013.01)
  *G06F 3/0481* (2013.01)

(52) U.S. Cl.
  CPC ............ *G06F 3/0485* (2013.01); *G06F 3/0481* (2013.01)
  USPC ....................................... 345/173; 178/18.01

(58) Field of Classification Search
  CPC ... G06F 3/0416; G06F 3/0412; G06F 3/0485; G06F 3/04855; G06F 3/0488; G06F 3/04886
  USPC ................. 345/173–177; 178/18.01
  See application file for complete search history.

(56) References Cited

U.S. PATENT DOCUMENTS

| | | | | |
|---|---|---|---|---|
| 5,327,161 A * | 7/1994 | Logan et al. | ................... | 345/157 |
| 5,543,590 A * | 8/1996 | Gillespie et al. | ........... | 178/18.06 |
| 5,880,717 A * | 3/1999 | Chan et al. | ..................... | 345/173 |
| 6,061,051 A * | 5/2000 | Chan et al. | ..................... | 345/173 |
| 6,331,863 B1 * | 12/2001 | Meier et al. | ................... | 345/684 |
| 7,394,453 B2 | 7/2008 | Woolley et al. | | |
| 8,049,733 B2 * | 11/2011 | Betts-Lacroix et al. | ....... | 345/173 |
| 2005/0168441 A1 * | 8/2005 | Obitsu et al. | .................. | 345/157 |
| 2006/0250372 A1 | 11/2006 | Lii | | |
| 2006/0290678 A1 | 12/2006 | Lii | | |
| 2006/0290679 A1 * | 12/2006 | Lii | ............................... | 345/173 |

FOREIGN PATENT DOCUMENTS

| | | |
|---|---|---|
| CN | 1862467 A | 11/2006 |
| CN | 1896922 A | 1/2007 |
| TW | 200639681 | 11/2006 |
| TW | 20070182 | 1/2007 |

* cited by examiner

*Primary Examiner* — Jason Mandeville
(74) *Attorney, Agent, or Firm* — Muncy, Geissler, Olds & Lowe, P.C.

(57) ABSTRACT

A cursor control method using a touchpad triggers an automatic movement signal for a cursor when an object moves from a first defined region into a second defined region of a two-dimensional touch sensor, or when an object stays in the second defined region for a preset duration after it moves from the first defined region into the second defined region, and define the automatic movement signal with the direction identical to that of the object moving into the second defined region, so that the cursor will keep moving in its last moving direction.

14 Claims, 8 Drawing Sheets

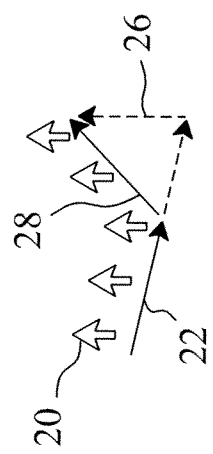

METHOD FOR CURSOR MOTION CONTROL BY A TOUCHPAD TO MOVE A CURSOR ON A DISPLAY SCREEN

FIELD OF THE INVENTION

The present invention is related generally to a touchpad and, more particularly, to a cursor control method using a touchpad.

BACKGROUND OF THE INVENTION

A touchpad is an input device for an object such as a finger and a touch pen to slide or touch thereon. One of its applications is to generate a signal to control a cursor on a display screen to move with change of relative coordinates or absolute coordinates. Moreover, a touchpad may support other extended functions such as button simulation. Due to the recent significant progress in technologies of displays and graphic chips, computer systems and even family multimedia systems now support high-definition displays, yet touchpads limited to their physical size are unable to support commensurate definition. For providing more convenient using environment, the so-called "edge-motion" function has been developed, by which when an object moves to an edge of a touchpad, the cursor on a window will automatically move or the page on a window will automatically scroll. For example, U.S. Pat. No. 5,880,411 proposes a method for a touchpad, by which, when an object slides to an edge of the touchpad, an automatic movement signal for a cursor will be asserted with a fixed direction pre-defined for the edge. However, this method only generates an automatic movement signal with either of four pre-defined directions, i.e. up, down, left and right, for the four edges of a touchpad, and thus lacks of flexibility in design.

SUMMARY OF THE INVENTION

An object of the present invention is to provide a cursor control method using a touchpad.

According to the present invention, a cursor control method using a touchpad will trigger an automatic movement signal for a cursor when an object moves from a first defined region into a second defined region of the touchpad, and define the automatic movement signal with the direction identical to that of the object moving into the second defined region.

According to the present invention, a cursor control method using a touchpad will detect an object moving from a first defined region into a second defined region of the touchpad, monitor the duration of the object staying in the second defined region, trigger an automatic movement signal for a cursor when the duration reaches a preset value, and define the automatic movement signal with the direction identical to that of the object moving into the second defined region.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which:

FIG. 8 is a schematic diagram showing an operation of using the method of FIG. 7.

DETAILED DESCRIPTION OF THE INVENTION

Figure 1:
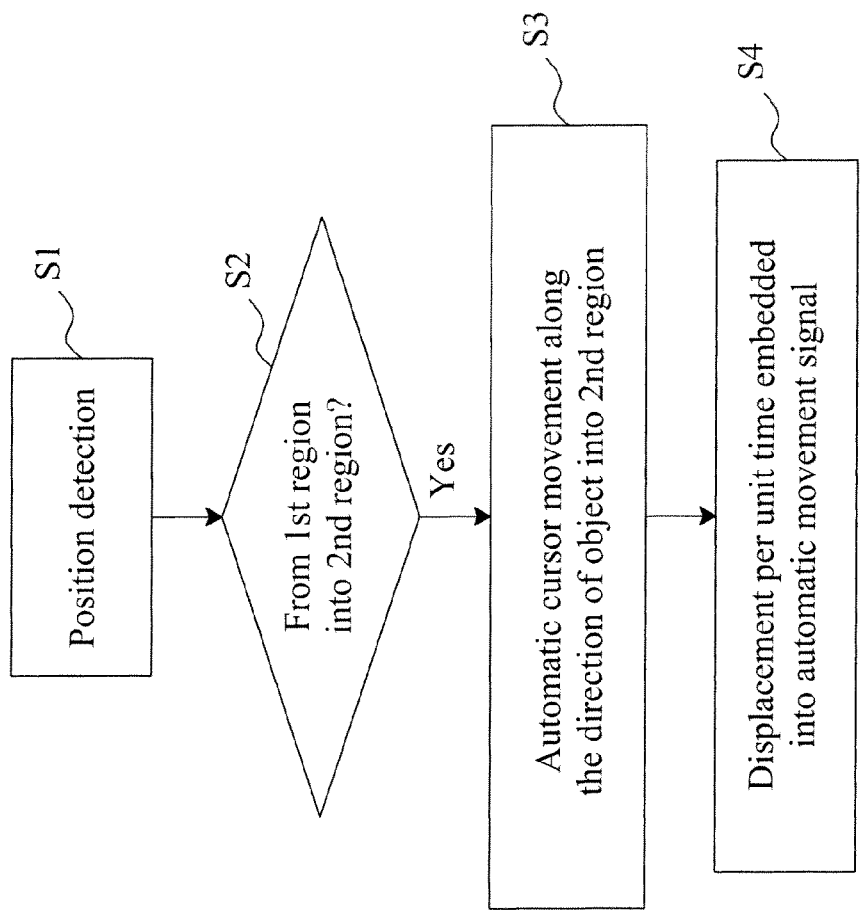
FIG. 1 is a flowchart of a first embodiment according to the present invention.
Figure 2:
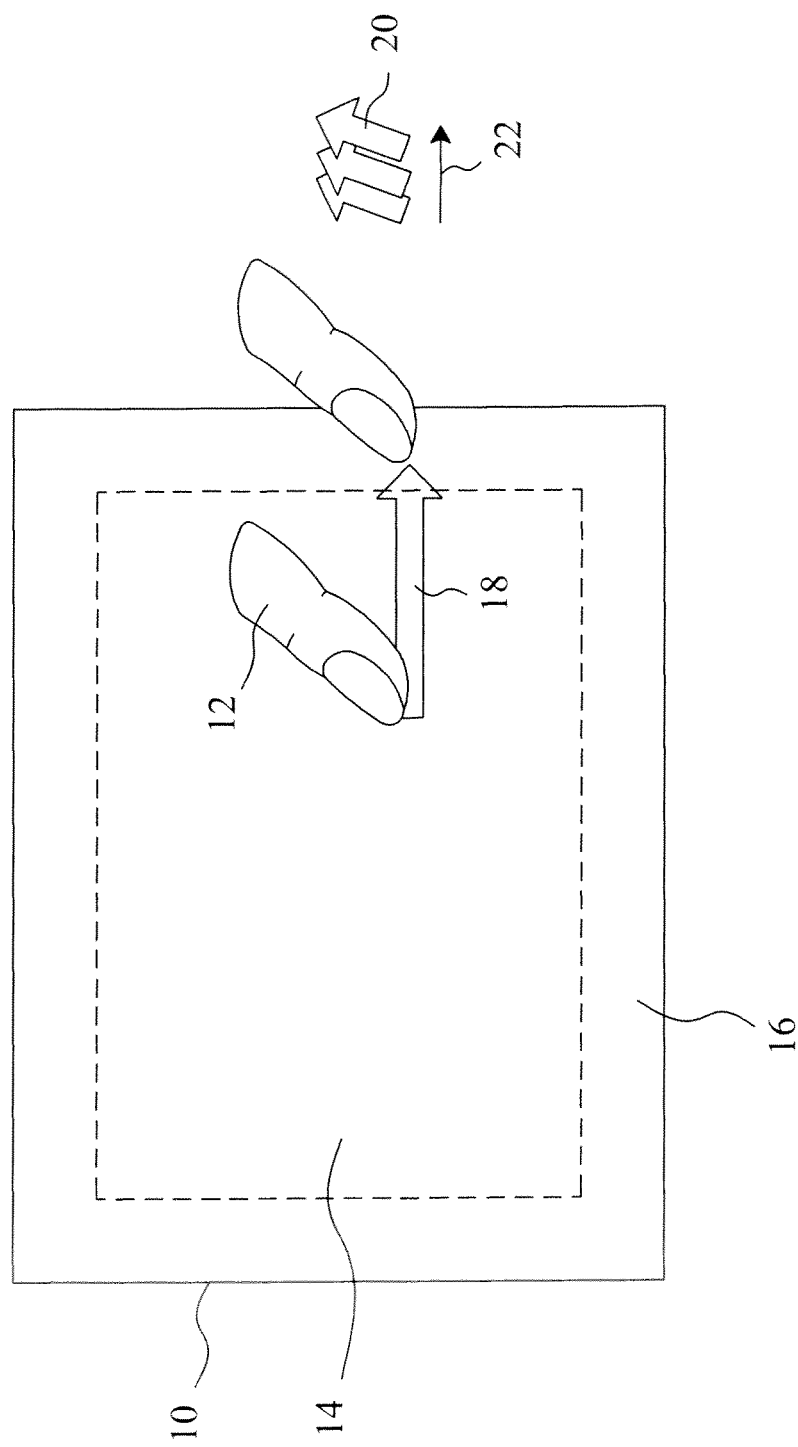
FIG. 2 is a schematic diagram showing an operation of using the method of FIG. 1.

FIG. 1 is a flowchart of a first embodiment according to the present invention, and FIG. 2 is a schematic diagram showing an operation of using this method on a touchpad. As shown in FIG. 2, the touchpad has a two-dimensional touch sensor 10 for position detection, and the touch sensor 10 has a first defined region 14 and a second defined region 16, as prior arts did. In this embodiment, the internal region of the touch sensor 10 is defined as the first defined region 14, and the peripheral region of the touch sensor 10 is defined as the second defined region 16. Referring to FIGS. 1 and 2, when an object 12 is on the touch sensor 10, step S1 will carry out position detection to locate the position of the object 12, as a touchpad typically does. During the object 12 in the first defined region 14, the touchpad will perform a normal cursor function, by which a position signal representative of the position of the object 12 is generated, including absolute coordinates, relative coordinates or other digital signals for example, for a cursor 20 on a display screen to move as the object 12 moving in the first defined region 14, as prior arts did. However, according to the present invention, step S2 will detect the movement of the object 12 from the first defined region 14 into the second defined region 16, and once this kind movement is detected, as shown by the arrow 18, the direction of the object 12 moving into the second defined region 16 is computed and recorded, and then step S3 will perform automatic cursor movement along the direction of the object 12 moving into the second defined region 16, by triggering an automatic movement signal with a direction 22 defined by the direction 18 for the cursor 20. Since the direction 22 of the automatic movement signal is identical to the direction 18 of the object 12 moving into the second defined region 16, the cursor 20 will keep moving along its original moving direction 22. As long as the object 12 remains in the second defined region 16, no matter it keeps moving or becomes still, the cursor 20 will always move in the direction 22 due to the automatic movement signal. In some embodiments, step S4 is further included, by which the displacement per unit time at the moment that the object 12 moves into the second defined region 16 is computed and embedded into the automatic movement signal, and this information may be used to control the edge-motion speed of the cursor 20.

Figure 3:
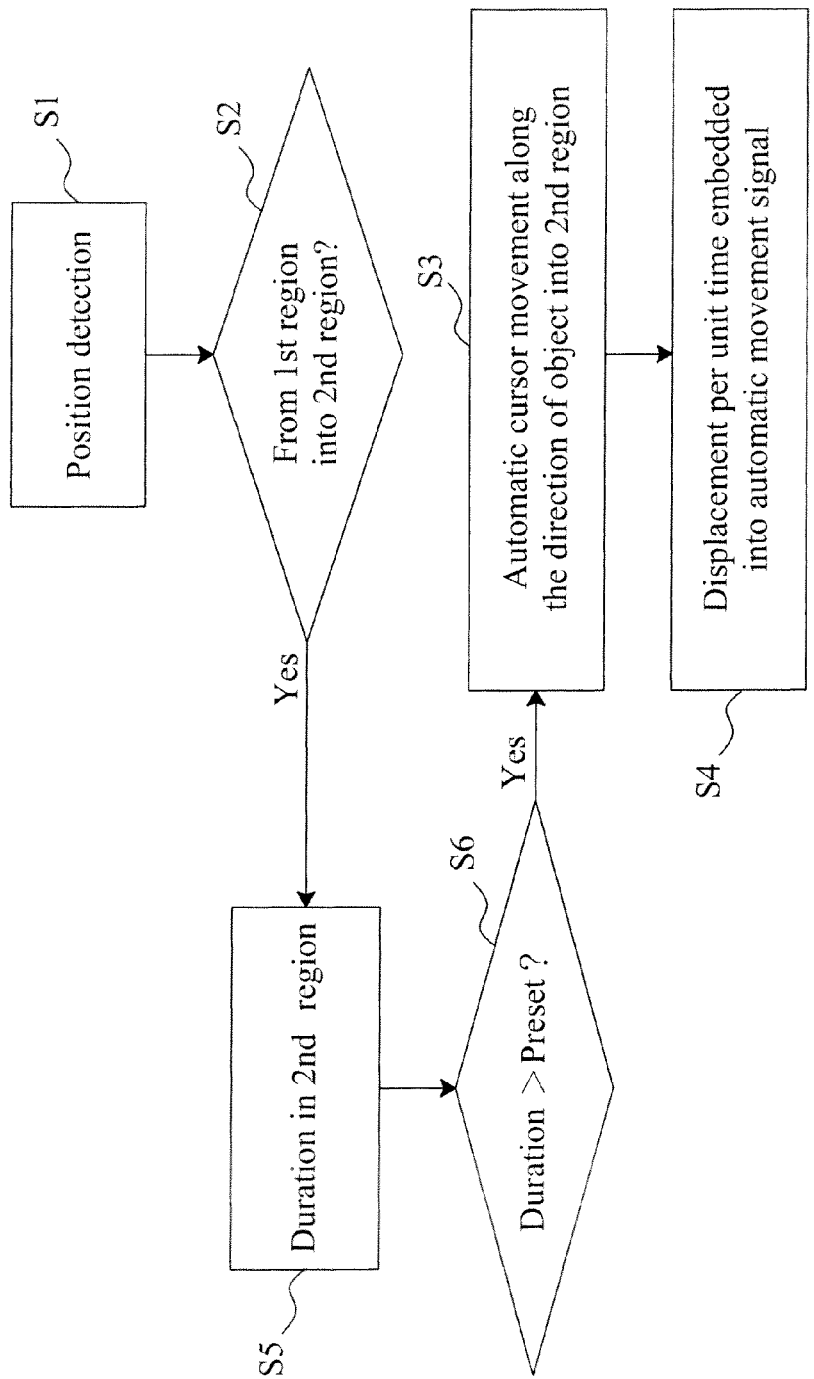
FIG. 3 is a flowchart of a second embodiment according to the present invention.

FIG. 3 is a flowchart of another embodiment modified from that of FIG. 1, in which, when step S2 detects the movement of the object 12 from the first defined region 14 into the second defined region 16, the process goes to step S5 to monitor the duration of the object 12 staying in the second defined region 16, and if step S6 detects the duration reaching a preset value, step S3 will be performed to trigger an automatic movement signal as described in the first embodiment. This embodiment may be used to avoid triggering an automatic movement signal by unintentionally sliding the object 12 into the second defined region 16.

Figure 4:
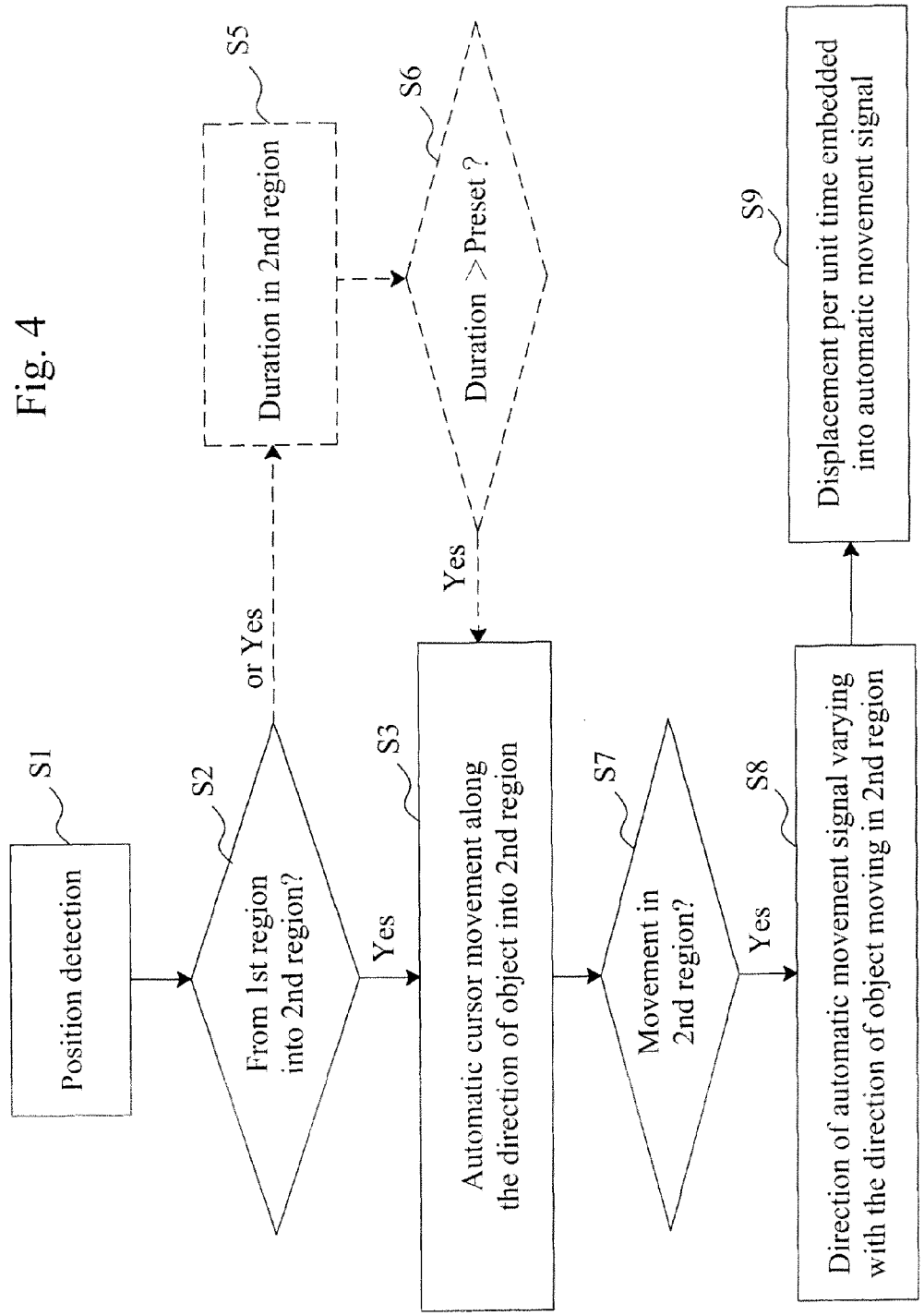
FIG. 4 is a flowchart of a third embodiment according to the present invention.
Figure 5:
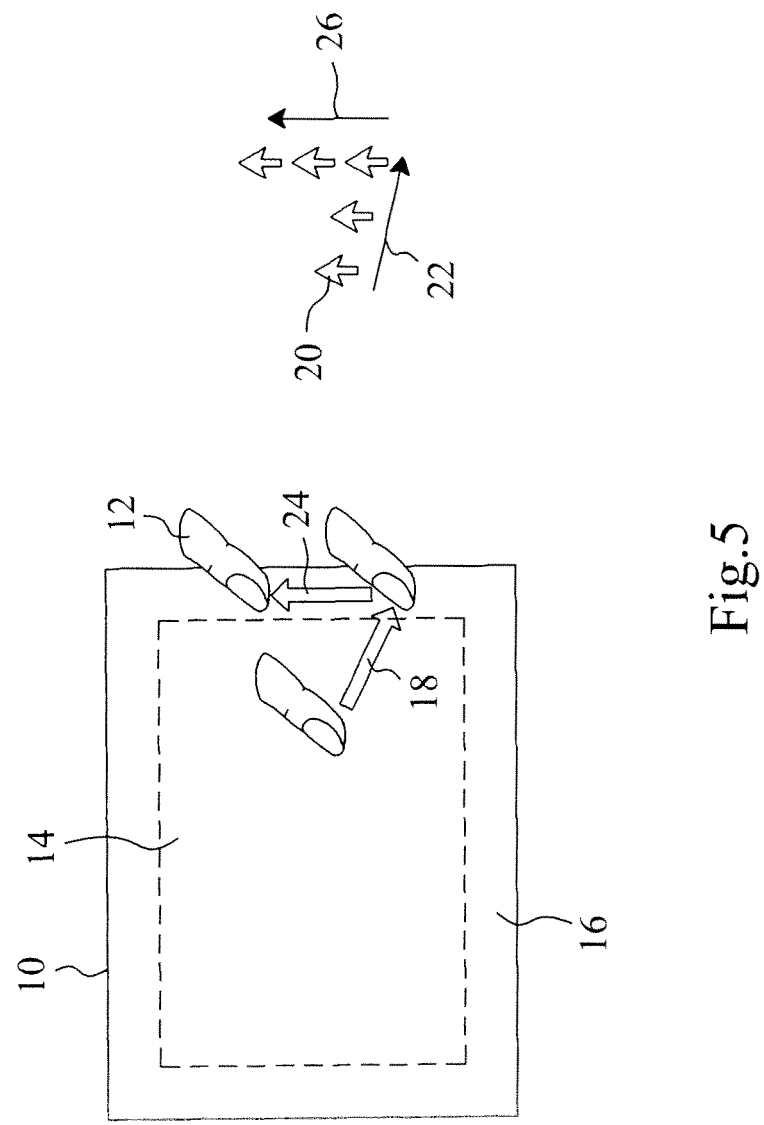
FIG. 5 is a schematic diagram showing an operation of using the method of FIG. 4.

FIG. 4 is a flowchart of a third embodiment according to the present invention, and FIG. 5 is a schematic diagram showing an operation of using this method on a touchpad, which may include the first three steps S1-S3 the same as that of FIG. 1, or the first five steps S1-S2, S5-S6 and S3 the same as that of FIG. 3. In either case, after step S3 triggers an automatic movement signal, step S7 will detect the movement of the object 12 in the second defined region 16, and once this kind movement is detected, as shown by the arrow 24, the direction 24 of the object 12 moving in the second defined region 16 is computed and recorded, step S8 varies the direction of the automatic movement signal with the direction 24 of the object 12 moving in the second defined region 16, as shown by the arrow 26, and the cursor 20 will automatically move in the direction 26 varying with the direction 24 of the object 12 moving in the second defined region 16. Therefore, if the object 12 stops in the second defined region 16, the cursor 20 will keep moving along its last direction in response to the automatic movement signal with the last direction; if the object 12 changes its moving direction in the second defined region 16, the cursor 20 will change to move in the changed moving direction of the object 12. In some embodiments, the method further comprises step S9, by which the displacement per unit time of the object 12 moving in the second defined region 16 is computed and embedded into the automatic movement signal. This information may be used to control the edge-motion speed of the cursor 20, for example, if the object 12 stops, the cursor 20 will keep moving with the last moving speed, and if the object 12 changes its moving speed, the cursor 20 will change its moving speed accordingly.

Figure 6:
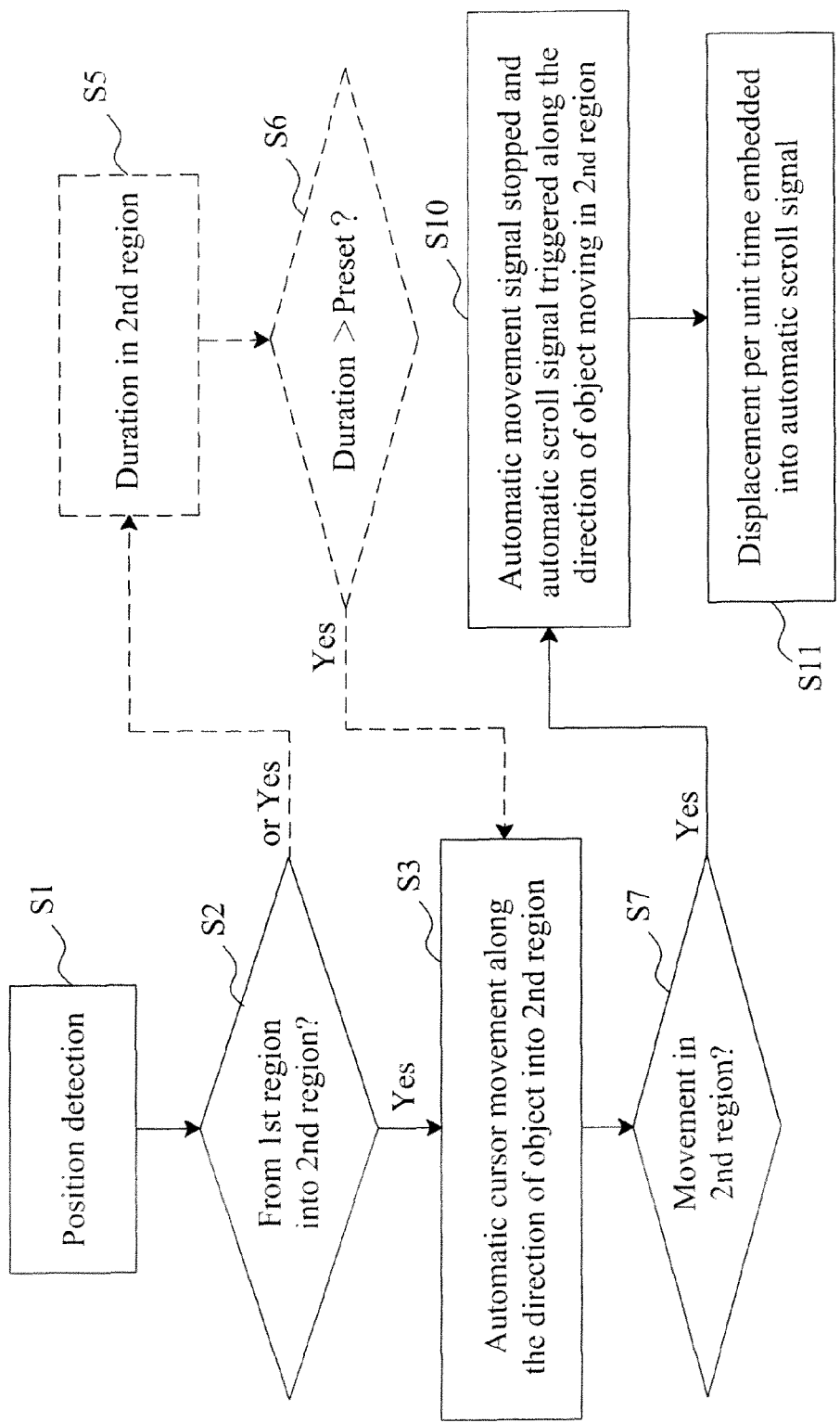
FIG. 6 is a flowchart of a fourth embodiment according to the present invention.

FIG. 6 is a flowchart of another embodiment modified from that of FIG. 4, in which, when step S7 detects the movement of the object 12 in the second defined region 16, the direction of the object 12 moving in the second defined region 16 is computed and recorded, and step S10 stops the automatic movement signal and triggers an automatic scroll signal to scroll a page on a window in the direction of the object 12 moving in the second defined region 16. In some embodiments, the method further comprises step S11, by which the displacement per unit time of the object 12 moving in the second defined region 16 is computed and embedded into the automatic scroll signal. This information may be used to control the scrolling speed of the scrolled page, for example, if the object 12 stops, the page will stop scrolling, and if the object 12 changes its moving speed, the page will scroll with a scrolling speed varying with the moving speed of the object 12.

Figure 7:
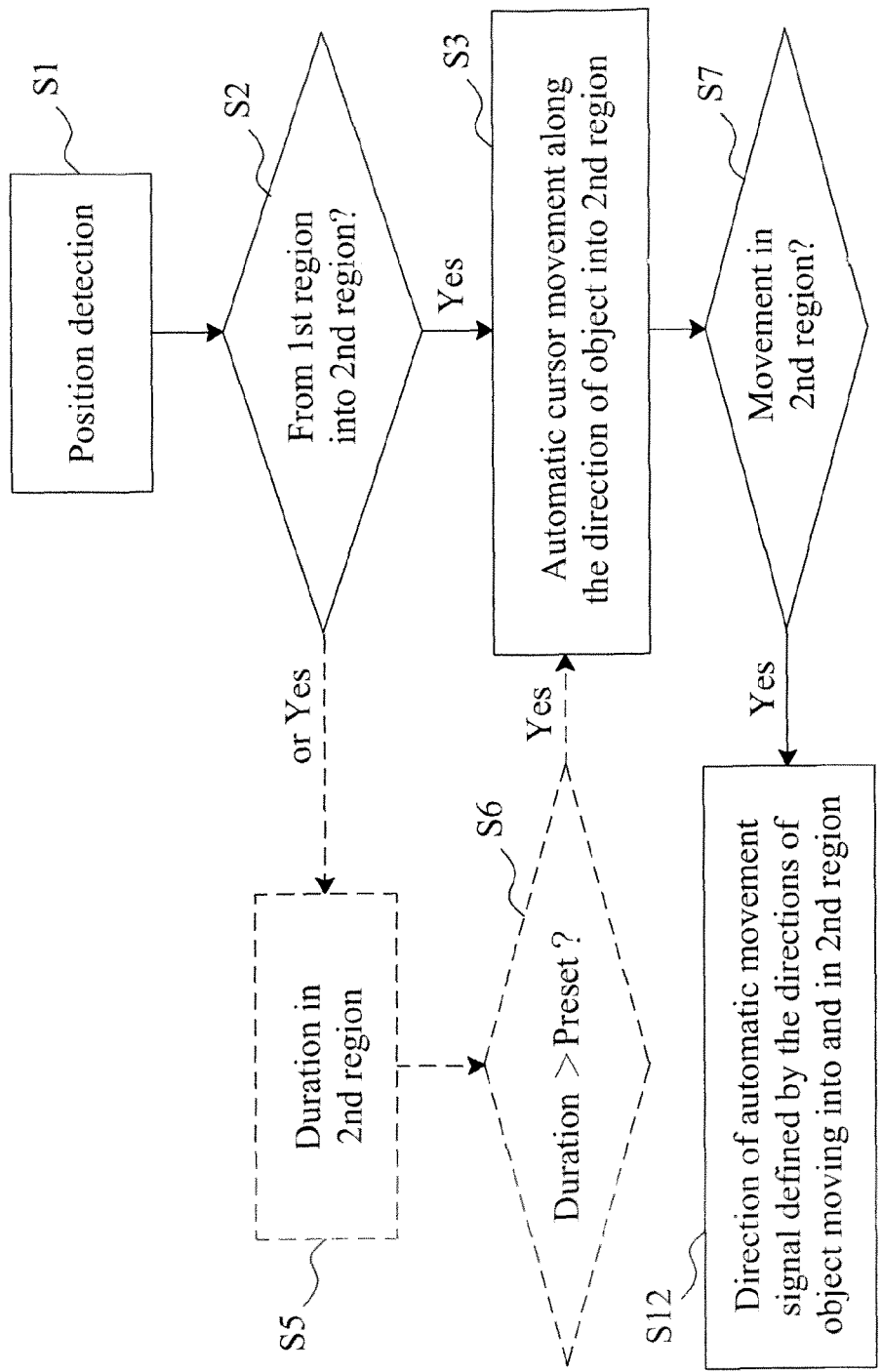
FIG. 7 is a flowchart of a fifth embodiment according to the present invention.

FIG. 7 is a flowchart of a fifth embodiment according to the present invention, and FIG. 8 is a schematic diagram showing an operation of using this method on a touchpad, which may include steps S1-S3 and S7, or S1-S2, S5-S7, S3 and S7, the same as that of FIGS. 4 and 6. In either case, when step S7 detects the movement of the object 12 in the second defined region 16, step S12 changes the direction of the automatic movement signal depending on the direction 22 of the object 12 moving into the second defined region 16 and the direction 26 of the object 12 moving in the second defined region 16, as shown by the arrow 28.

In the foregoing embodiments, when the object 12 leaves the second defined region 16, the touchpad will stop the automatic movement signal or the automatic scroll signal, or maintain the automatic movement signal or the automatic scroll signal until it is detected that the object 12 is moving in the first defined region 14.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A cursor control method using a touchpad including a two-dimensional touch sensor for position detection and having a first defined region and a second defined region thereon, the cursor control method comprising the steps of:
   detecting a movement of an object moving from the first defined region into the second defined region;
   computing and recording an object moving direction of the object moving from the first defined region into the second defined region;
   triggering an automatic movement signal for controlling a cursor to automatically move along a cursor moving direction identical to the computed and recorded object moving direction from the first defined region into the second defined region;
   after triggering the automatic movement signal, monitoring a movement of the object in, the second defined region; and
   upon detection of movement of the object in the second defined region, stopping the automatic movement signal and triggering an automatic scroll signal along an updated direction and an updated speed corresponding to the detection of the movement of the object to scroll a page on a window, wherein the automatic scroll signal has a scrolling direction and a scrolling speed identical to the updated direction and the updated speed of the object moving in the second defined region.

2. The cursor control method of claim 1, further comprising the step of embedding a displacement per unit time of the object moving into the second defined region into the automatic movement signal.

3. The cursor control method of claim 1, further comprising the steps of:
   after triggering the automatic movement signal, continuously monitoring a movement of the object in the second defined region; and
   varying the cursor moving direction of the automatic movement signal with the object moving direction of the object continuously moving in the second defined region.

4. The cursor control method of claim 3, further comprising the step of embedding a displacement per unit time of the object moving in the second defined region into the automatic movement signal.

5. The cursor control method of claim 1, further comprising the steps of:
   after triggering the automatic movement signal, monitoring a movement of the object in the second defined region; and
   varying the cursor moving direction of the automatic movement signal depending on a direction of a vector addition determined by the object moving direction of the object moving from the first defined region into the second defined region and the object moving direction of the object moving in the second defined region.

6. The cursor control method of claim 5, further comprising the step of embedding a displacement per unit time of the object moving in the second defined region into the automatic movement signal.

7. The cursor control method of claim 1, further comprising the step of embedding a displacement per unit time of the object moving in the second defined region into the automatic scroll signal.

8. A cursor control method using a touchpad including a two-dimensional touch sensor for position detection and having a first defined region and a second defined region thereon, the cursor control method comprising the steps of:
    detecting a movement of an object moving from the first defined region into the second defined region;
    computing and recording an object moving direction of the object moving from the first defined region into the second defined region;
    monitoring a duration of the object staying in the second defined region after the object moves from the first defined region into the second defined region;
    in response to the duration reaching a preset value, triggering an automatic movement signal for controlling a cursor to automatically move along a cursor moving direction identical to the computed and recorded object moving direction from the first defined region into the second defined region;
    after triggering the automatic movement signal, monitoring a movement of the object in the second defined region; and
    upon detection of movement of the object in the second defined region, stopping the automatic movement signal and triggering an automatic scroll signal along an updated direction and an updated speed corresponding to the detection of the movement of the object to scroll a page on a window, wherein the automatic scroll signal has a scrolling direction and a scrolling speed identical to the updated direction and the updated speed of the object moving in the second defined region.

9. The cursor control method of claim 8, further comprising the step of embedding a displacement per unit time of the object moving into the second defined region into the automatic movement signal.

10. The cursor control method of claim 8, further comprising the steps of:
    after triggering the automatic movement signal, continuously monitoring a movement of the object in the second defined region; and
    varying the cursor moving direction of the automatic movement signal with the object moving direction of the object continuously moving in the second defined region.

11. The cursor control method of claim 10, further comprising the step of embedding a displacement per unit time of the object moving in the second defined region into the automatic movement signal.

12. The cursor control method of claim 8, further comprising the steps of:
    after triggering the automatic movement signal, monitoring a movement of the object in the second defined region; and
    varying the cursor moving direction of the automatic movement signal depending on a direction of a vector addition determined by the object moving direction of the object moving from the first defined region into the second defined region and the object moving direction of the object moving in the second defined region.

13. The cursor control method of claim 12, further comprising the step of embedding a displacement per unit time of the object moving in the second defined region into the automatic movement signal.

14. The cursor control method of claim 8, further comprising the step of embedding a displacement per unit time of the object moving in the second defined region into the automatic scroll signal.

* * * * *